(12) United States Patent
Yokomae et al.

(10) Patent No.: US 6,640,058 B2
(45) Date of Patent: Oct. 28, 2003

(54) CAMERA HAVING A MINIATURIZED EXTERIOR SHAPE

(75) Inventors: Yoshihiro Yokomae, Kokubunji (JP); Toshifumi Nakano, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/126,101

(22) Filed: Apr. 18, 2002

(65) Prior Publication Data

US 2002/0159776 A1 Oct. 31, 2002

(30) Foreign Application Priority Data

Apr. 26, 2001 (JP) ........................................ 2001-129975

(51) Int. Cl.[7] .............................................. G03B 17/02
(52) U.S. Cl. ...................... 396/539; 396/536; 396/535
(58) Field of Search ................................. 396/535, 536, 396/538, 539, 540, 537

(56) References Cited

U.S. PATENT DOCUMENTS 5,227,822 A   7/1993   Takahashi et al.
5,701,531 A * 12/1997   Tanaka et al. .............. 396/319

FOREIGN PATENT DOCUMENTS

| JP | 4-32655 | 8/1992 |
|---|---|---|
| JP | 6-235962 | 8/1994 |
| JP | 2783443 B2 | 5/1998 |
| JP | 2000-347264 A | 12/2000 |

\* cited by examiner

*Primary Examiner*—Russell Adams
*Assistant Examiner*—Michael Dalakis
(74) *Attorney, Agent, or Firm*—Frishauf, Holtz, Goodman & Chick, P.C.

(57) ABSTRACT

A camera is provided which has a back cover for opening and closing an aperture, a spool chamber and a cassette chamber. A battery chamber for housing a battery is disposed on a supporting shaft side of the back cover, and the aforementioned battery chamber is present obliquely behind the cassette chamber inside the camera when the back cover is in a closed state. A part of the battery chamber protrudes from the back face of the back cover. Therefore, the exterior shape of the camera can be miniaturized and downsized without hindering loading of a film cassette. Further, since the battery chamber portion protruding from the back cover can be made to function as a grip portion of the camera, a camera superior in portability and favorable in holdability is provided.

19 Claims, 6 Drawing Sheets

CAMERA HAVING A MINIATURIZED EXTERIOR SHAPE

This application claims the benefit of Japanese Application No. 2001-129975 filed in Japan on Apr. 26, 2001, the contents of which are incorporated herein by reference.

BACKGROUND OF THE INVENTION

1. Field of the Invention

The present invention relates to a housing structure of electric components such as a battery or capacitor, for example, in a camera.

2. Description of the Related Art

Conventionally, with respect to the battery chamber and capacitor chamber for stroboscope flashing, the camera disclosed in Japanese Patent Laid-Open Publication No. 2000-347264 disposes a retaining member for retaining the battery and capacitor behind the platen. With this camera, the width of the exterior member of the camera can be narrowed, and the camera grip portion can also be made into a suitable size.

Moreover, as the disposition in another conventional camera, there is a type of camera in which a battery chamber and a capacitor chamber are disposed outside of the cassette (cartridge) chamber.

Nevertheless, with the camera disclosed in the foregoing Japanese Patent Laid-Open Publication No. 2000-47264, since the battery chamber and capacitor chamber are disposed behind the platen, the overall thickness of the camera is increased, and the camera becomes large, thereby leaving the problem of portability unsolved.

Moreover, with the aforementioned conventional camera which disposes the battery chamber and capacitor chamber behind the cassette chamber, the width in the lateral direction of the camera is increased, thereby leaving the problem of realizing miniaturization of the camera unsolved.

SUMMARY OF THE INVENTION

The present invention was devised in view of solving the foregoing problems, and an object thereof is to provide a camera whose exterior shape can be miniaturized, which is superior in portability, and which has a favorable holdability.

One camera of the present invention comprises: a cassette chamber adapted to house a film cassette; a cover member for opening and closing an aperture of the cassette chamber; and an electric component housing portion which is disposed on the cover member and which is for housing a prescribed electric component. The electric component housing portion is positioned within the trajectory of the film cassette when being loaded and removed to and from the cassette chamber in a state where the cover member is closed, and stays outside the trajectory in a state where the cover member is opened.

Moreover, another camera of the present invention comprises: a cassette chamber adapted to house a film cassette in a state where a film pullout portion of the film cassette is at a prescribed inclination to an aperture of the camera; a cover member for opening and closing the cassette chamber and having an exterior surface formed approximately parallel to the aperture; and an electric component housing portion provided on the cover member and disposed in a space formed with the exterior surface of the cover member, the film pullout portion of the film cassette housed in the cassette chamber, and a side portion of the camera.

Further, yet another camera according to the present invention comprises: a cassette chamber adapted to house a film cassette; a spool chamber of an approximately cylindrical shape for winding and housing a film in the film cassette housed in the cassette chamber; a cover member capable of opening and closing apertures of the cassette chamber and the spool chamber; and an electric component housing portion disposed on the cover member and provided in a position so as to stay away from a tip position of the film upon the film being loaded into the film cassette when the cover member is in an open position.

Other characteristics and benefits of the present invention will become evident from the following description.

DETAILED DESCRIPTION OF THE PREFERRED EMBODIMENTS

Embodiments of the present invention are now described with reference to the drawings.

Figure 1:
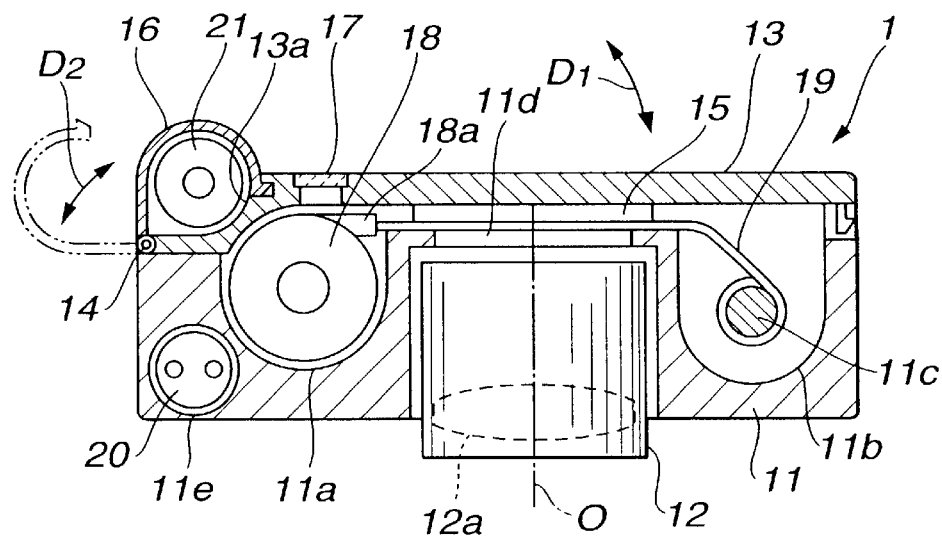
FIG. 1 is a lateral sectional view of the camera according to the first embodiment of the present invention, and illustrates a state where a back cover is closed.
Figure 2:
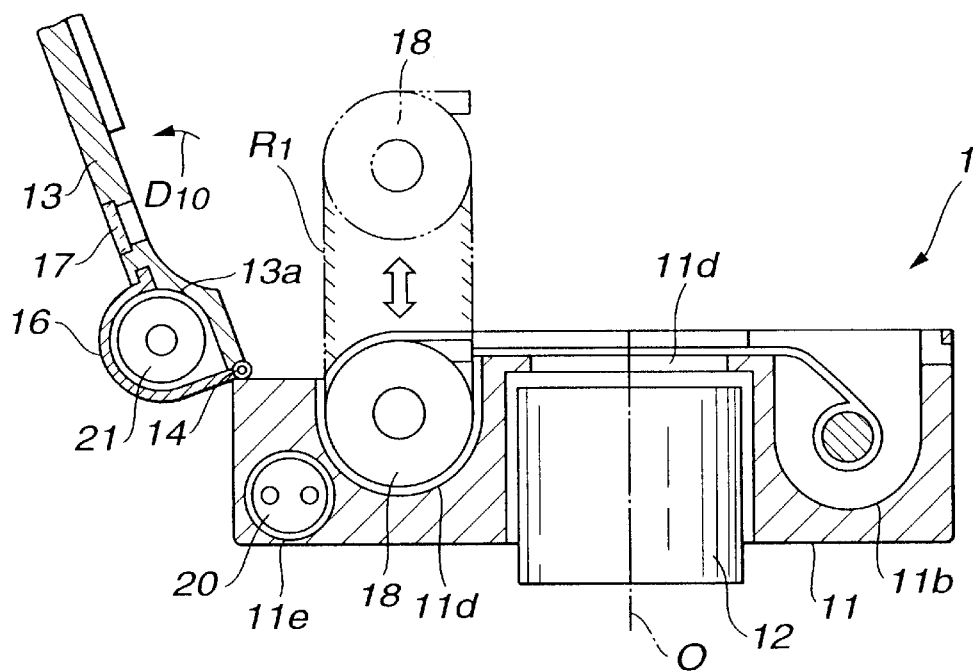
FIG. 2 is a lateral sectional view of the camera according to the first embodiment of foregoing FIG. 1, and illustrates a state where the back cover is opened.
Figure 3:
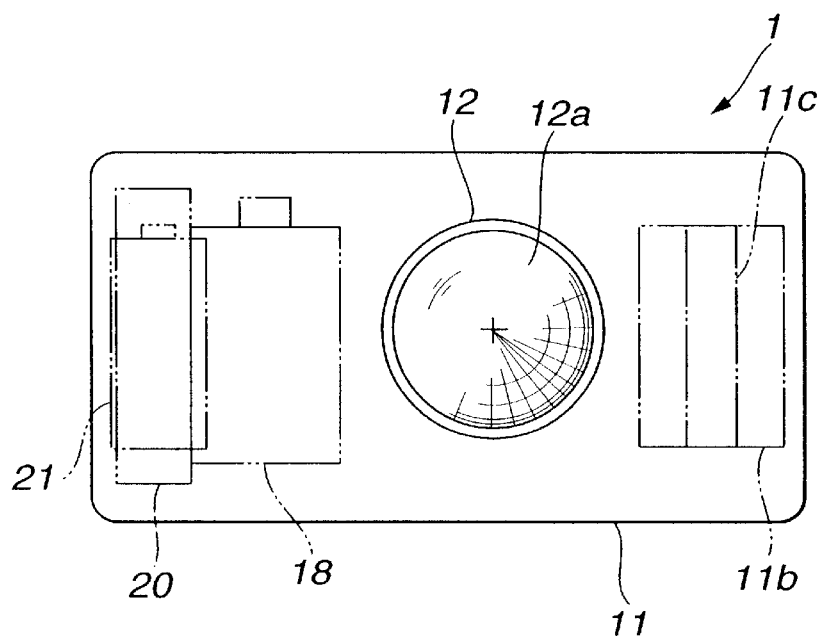
FIG. 3 is a front view of the camera according to the first embodiment of foregoing FIG. 1, and illustrates the arrangement of the cassette, spool, capacitor and battery.

FIG. 1 is a lateral sectional view of the camera according to the first embodiment of the present invention, and illustrates a state where the back cover is closed. FIG. 2 is a lateral sectional view of the foregoing camera, and illustrates a state where the back cover is opened. FIG. 3 is a front view of the foregoing camera, and illustrates the arrangement of the cassette, spool, capacitor and battery. Moreover, in the following explanation, the direction in which the camera faces the photographic subject is referred to as the front direction, and the direction in which the film faces is referred to as the back direction. The left and right directions of the camera will be represented from the direction viewed from the photographic subject.

As shown in FIG. 1 and FIG. 2, in the camera 1 of the present embodiment, a lens barrel 12 having a photographing lens 12a is disposed in the center of a camera main body 11 as the exterior member of the camera, and an aperture 11d is disposed behind the lens barrel 12. A cassette chamber (cartridge chamber) 11a is provided to the left side of the aperture 11d of the camera main body 11, and a spool chamber 11b having a spool 11c is provided to the right side thereof. A capacitor chamber 11e is disposed in the approximately triangle shape space in the left anterior oblique position of the camera main body 11 adjacent to the cassette chamber 11a. Further, a back cover 13 as the cover member for opening and closing the back face of the aperture 11d and the apertures of the cassette chamber 11a and spool chamber 11b is disposed at the back surface of the camera main body 11.

A film cassette (film cartridge; hereinafter referred to as cassette) 18 can be loaded into the cassette chamber 11a, and, in the loaded state, a film pullout portion 18a of the cassette 18 is retained in a parallel state toward a film feeding path on the aperture 11d.

The capacitor 20, which is an electric component, housed in the capacitor chamber 11e is of a cylindrical shape.

The back cover 13 is supported turnably so as to open and close in the D1 direction with a supporting shaft 14 as a shaft member fixed to the left end side of the camera main body 11. This back cover 13 is provided with a platen 15 for pressing a film 19 to the aperture 11d, a cassette information display window 17 as a cassette observation window at a position facing the cassette chamber 11a, a battery chamber 13a as the electric component housing portion in the vicinity of the supporting shaft 14, and a battery cover 16, which is for opening and closing the battery chamber 13a, turnably supported with the supporting shaft 14. Moreover, the back cover 13 has an exterior surface parallel to the face of the aperture 11d when in a closed state. In addition, the battery chamber 13a is disposed in a position where the cassette information display window 17 is not located.

The battery cover 16 provided to the back cover 13 is turnably supported by the supporting shaft 14 together with the back cover 13, and opens and closes the battery chamber 13a by turning in the D2 direction against the supporting shaft 14. A power supply battery 21 as the cylindrical electric component is loaded and removed to and from the battery chamber 13a by opening and closing the battery cover 16. Further, a locking claw for locking at a closed position against the back cover 13 is provided to the battery cover 16. The joint portion of the battery cover 16 and battery chamber 13a possesses a waterproof structure.

Further, the battery chamber 13a is positioned in the rear oblique position of the cassette chamber 11a as shown in FIG. 1 with the back cover 13 in a closed state, and is positioned within a loading and unloading trajectory range R1 of the cassette 18 described later. Moreover, a part of the battery cover 16 and battery chamber 13a are positioned to protrude toward the back of the left end portion of the back cover 13, and the protruding portion of the battery cover 16 and battery chamber 13a functions as a grip portion of the camera with the back cover 13 in a closed state.

The cassette 18 loaded in the cassette chamber 11a, the spool 11c of the spool chamber 11b, the capacitor 20 housed in the capacitor chamber 11e, and the battery 21 housed in the battery chamber 13a are approximately parallel to each other in the axial direction, respectively, as shown in FIG. 3, and are housed or retained in a posture along the vertical direction.

In the camera 1 of the present embodiment having the structure described above, when loading or removing the cassette 18 to or from the cassette chamber 11a, the back cover 13 is turned to a turning position D10 shown in FIG. 2 in order to achieve an open state. In this open state, the back cover 13 stays outside the loading and unloading trajectory range R1 of the cassette 18 together with the battery chamber 13a, and the aperture of the cassette chamber 11a is thereby released. The cassette 18 may thereby be loaded and removed to and from the cassette chamber 11a.

After loading the cassette 18 in the cassette chamber 11a, the back cover 13 is turned to achieve the closed state shown in FIG. 1. In this closed state, the back cover 13 covers the apertures of the cassette chamber 11a and spool chamber 11b, and simultaneously makes the film 19 contact the back face of the aperture 11d via the platen 15 in a pressurized manner.

After the cassette 18 is loaded in the cassette chamber 11a, the film 19 inside the cassette 18 is wound with the spool 11c of the spool chamber 11b, and photographs may be taken thereby.

With the camera 1 of the first embodiment described above, the capacitor chamber 11e is disposed in the anterior oblique position of the cassette chamber 11a within the camera main body 11. And, the battery chamber 13a is disposed in the rear oblique position of the cassette chamber 11a on the back cover 13 which opens and closes. Moreover, apart of the battery chamber 13a is disposed in a state of protruding in the left rear position from the back face of the back cover 13. Therefore, the capacitor chamber 11e and battery chamber 13a can be disposed in the cassette chamber 11a in an extremely close state, and, since the sizes in the width direction and thickness direction (O direction of optical axis) of the exterior shape of the camera main body 11 can be reduced, the miniaturization of the camera is thereby realized. The portability can also be improved simultaneously. Further, in a state where the back cover 13 is closed, a part of the exterior portion of the battery chamber 13a protrudes in the rear left position of the back cover 13, and, since this protruding portion can be made to function as a grip portion of the camera, a favorable holdability of the camera can be maintained. In addition, since the turnable supporting shaft 14 of the back cover 13 is also used as the turnable supporting shaft of the battery cover 16, the number of structural components has been reduced.

Moreover, the battery chamber 13a, which is the electric component housing portion, provided to the back cover 13, can be changed to a capacitor chamber for housing a stroboscope flashing capacitor. Here, a cover for opening and closing the capacitor chamber is not necessary.

Next, the camera according to the second embodiment of the present invention is described with reference to FIG. 4 to FIG. 6.

Figure 4:
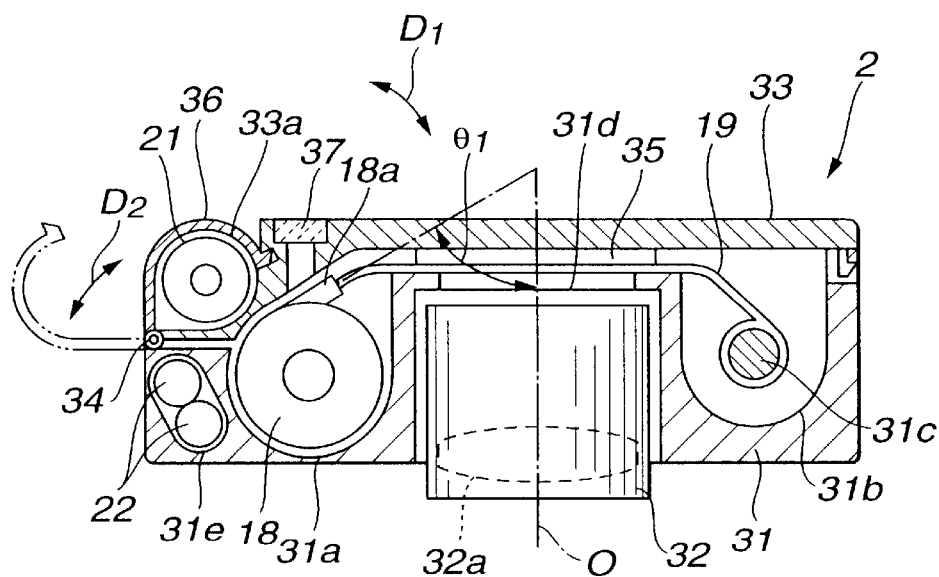
FIG. 4 is a lateral sectional view of the camera according to the second embodiment of the present invention, and illustrates a state where the back cover is closed.

FIG. 4 is a lateral sectional view of the camera according to the second embodiment of the present invention, and illustrates a state where the back cover is closed. FIG. 5 is a lateral sectional view of the foregoing camera, and illustrates a state where the back cover is opened. FIG. 6 is a front view of the foregoing camera, and illustrates the arrangement of the cassette, spool, capacitor and battery.

Figure 5:
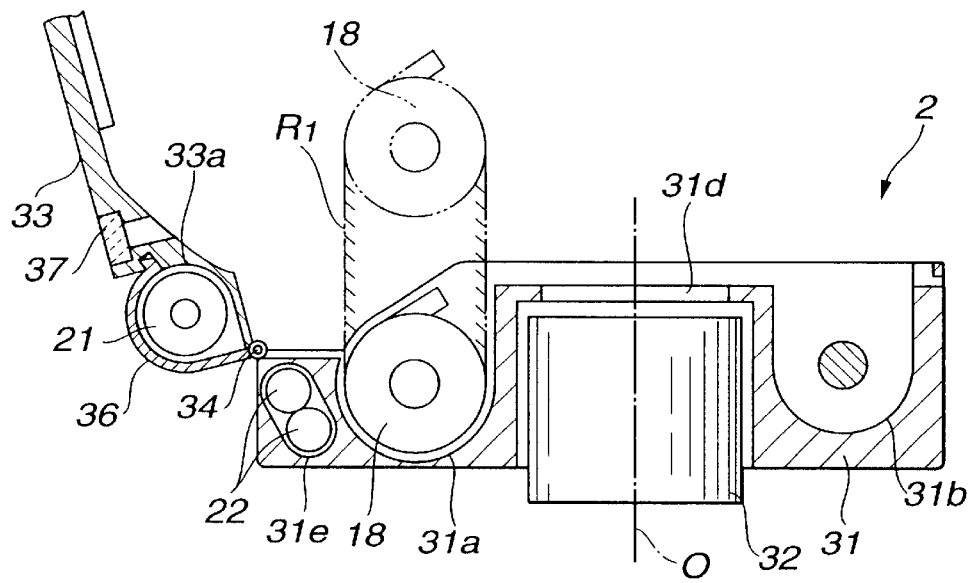
FIG. 5 is a lateral sectional view of the camera according to the second embodiment of foregoing FIG. 4, and illustrates a state where the back cover is opened.

As shown in FIG. 4 and FIG. 5, the camera 2 of the present embodiment differs from the camera 1 of the foregoing first embodiment particularly regarding the loading posture of the cassette. A lens barrel 32 is disposed in the center of the camera main body 31 as the exterior member of the camera 2, and an aperture 31d is disposed behind the lens barrel 32. A cassette chamber 31a is provided to the left side of the aperture 31d of the camera main body 31, and a spool chamber 31b having a spool 31c is provided to the right side thereof. A capacitor chamber 31e is disposed in the triangular column space in the left anterior position of the camera main body 31 adjacent to the cassette chamber 31a. Further, two capacitors 22 having a cylindrical shape are housed in the capacitor chamber 31e. Moreover, a back cover 33 as the cover member for opening and closing the back face of the aperture 31d and the aperture of the cassette chamber 31a and spool chamber 31b is disposed at the back surface of the camera main body 31.

A cassette 18 is loaded in the cassette chamber 31a. In this loaded state, the direction of the film pullout portion 18a of the cassette 18 is inclined against the face of the aperture 31d, and such pullout direction forms an angle θ1, which is 90 degrees or less, with respect to the optical axis O. The film 19 pulled out from the film pullout portion 18a of the cassette 18 is temporarily fed to the direction in which the aperture 31d exists with being bent. Therefore, the cassette chamber 31a can be disposed closer to the front surface of the camera main body 31 in comparison with the camera 1 of the first embodiment, and the cassette chamber 31a can be disposed close to the lens barrel 32.

Thereby, an approximately triangular space is formed at the left rear oblique position of the cassette chamber 31a with the flat surface of the film pullout portion 18a of the cassette 18, the back face of the camera 2, and the left side face of the camera 2. Then, by housing a battery 21 having a diameter larger than the capacitor 22 in the space of the approximately triangular shape in the left rear oblique position, and housing the capacitor 22 in the space of the approximately triangular shape in the left anterior oblique position, miniaturization of the measurements particularly in the thickness direction and lateral direction of the camera can be sought.

The back cover 33 is turnably supported so as to open and close in the D1 direction with a supporting shaft 34 as a shaft member fixed to the left end side of the camera main body 31. This back cover 33 is provided with a platen 35 for pressing the film 19 to the aperture 31d, a battery chamber 33a as the electric component housing portion in the vicinity of the supporting shaft 34, a battery cover 36, which is for opening and closing the battery chamber 33a, turnably supported with the supporting shaft 34, and a cassette information display window 37 as a cassette observation window at a position facing the cassette chamber. Moreover, the back cover 33 has an exterior surface parallel to the face of the aperture 31d when in a closed state.

Further, instead of providing the observation window 37 to the back cover 33, the structure may be such that the film information is displayed on a liquid crystal display unit provided separately.

The battery chamber 33a provided to the back cover 33 is disposed in a position where the cassette information display window 37 is not positioned, and a power supply battery 21, which is a cylindrical electric component, is housed therein. Provided to the battery chamber 33a is a battery cover 36 turnably supported by the supporting shaft 34 together with the back cover 33, and this battery cover 36 opens and closes the battery chamber 33a by turning in the D2 direction against the supporting shaft 34. The power supply battery 21 as the cylindrical electric component is loaded and removed to and from the battery chamber 33a by opening and closing the battery cover 36. Further, a locking claw for locking at a closed position against the back cover 33 is provided to the battery cover 36. The joint portion of the battery cover 36 and battery chamber 33a possesses a waterproof structure.

Further, the battery chamber 33a moves into the rear oblique position of the cassette chamber 31a as shown in FIG. 4 with the back cover 33 in a closed state, and is positioned within the loading and unloading trajectory range R1 of the cassette 18 described later. As described above, since the cassette chamber 31a is positioned further frontward against the camera main body 31, the battery chamber 33a of the back cover 33 can be moved further into the anterior direction. Therefore, as shown in FIG. 4, the portion functioning as the grip portion of the camera, where the protruding portion in which the battery chamber 33a is protruding from the back face of the back cover 33, can be made small. Moreover, the measurement of the lateral direction of the camera can be reduced since the cassette chamber 31a is disposed close to the lens barrel 32.

Figure 6:
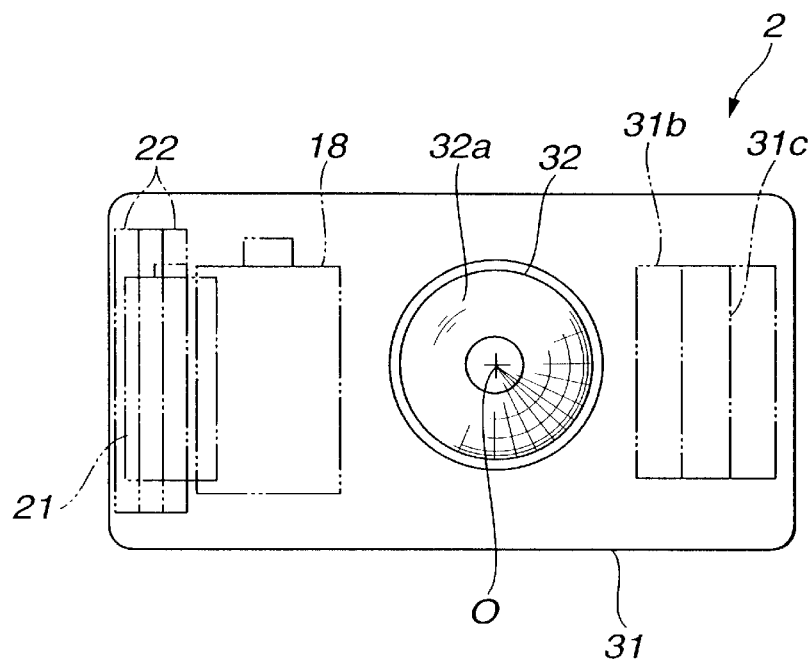
FIG. 6 is a front view of the camera according to the second embodiment of foregoing FIG. 4, and illustrates the arrangement of the cassette, spool, capacitor and battery.

The cassette 18 loaded in the cassette chamber 31a, the spool 31c of the spool chamber 31b, the capacitor 22 housed in the capacitor chamber 31e, and the battery 21 housed in the battery chamber 33a are approximately parallel to each other in the axial direction, as shown in FIG. 6, and are housed or retained in a posture along the vertical direction.

In the camera 2 of the present embodiment having the structure described above, when loading or removing the cassette 18 to or from the cassette chamber 31a, the back cover 33 is turned to the opened state shown in FIG. 5. In this open state, the back cover 33 stays outside the loading and unloading trajectory range R1 of the cassette 18 together with the battery chamber 33a, and the aperture of the cassette chamber 31a is thereby released. The cassette 18 may thereby be loaded and removed to and from the cassette chamber 31a.

After loading the cassette 18 in the cassette chamber 31a, the back cover 33 is turned to achieve the closed state shown in FIG. 4. In this closed state, the back cover 33 covers the apertures of the cassette chamber 31a and spool chamber 31b, and simultaneously makes the film 19 contact the back face of the aperture 31d via the platen 35 in a pressurized manner.

After the cassette 18 is loaded in the cassette chamber 31a, the film 19 inside the cassette 18 is wound with the spool 31c of the spool chamber 31b, and photographs may be taken thereby.

With the camera 2 of the second embodiment described above, the cassette chamber 31a is disposed in the vicinity of a position as close as possible to the front side of the camera main body 31, and the capacitor chamber 31e is disposed beside the cassette chamber 31a within the camera main body 31. And, the battery chamber 33a is disposed in the rear oblique position of the cassette chamber 31a on the back cover 33 which opens and closes. Moreover, a part of the battery chamber 33a is disposed in a state of protruding slightly in the left rear position from the back face of the back cover 33. Therefore, since the measurements in the width direction and thickness direction (O direction of optical axis) of the exterior shape of the camera main body 31 can be reduced while making the battery chamber 33a protrude such that the camera can be gripped easily, further miniaturization of the camera is thereby realized. As a result, the camera can be held more naturally. In addition, since the turnable supporting shaft 34 of the back cover 33 is also used as the turnable supporting shaft of the battery cover 36, the number of structural components has been reduced.

Next, the camera according to the third embodiment of the present invention is described with reference to FIG. 7 to FIG. 9.

Figure 7:
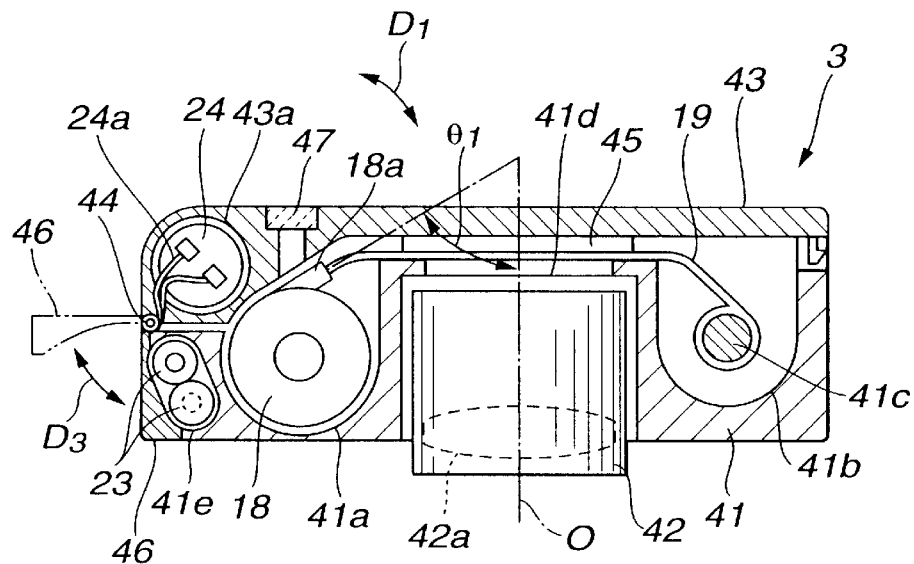
FIG. 7 is a lateral sectional view of the camera according to the third embodiment of the present invention, and illustrates a state where the back cover is closed.

FIG. 7 is a lateral sectional view of the camera according to the third embodiment of the present invention, and illustrates a state where the back cover is closed. FIG. 8 is a lateral sectional view of the camera, and illustrates a state where the back cover is opened. FIG. 9 is a front view of the camera, and illustrates the arrangement of the cassette, spool, capacitor and battery.

Figure 8:
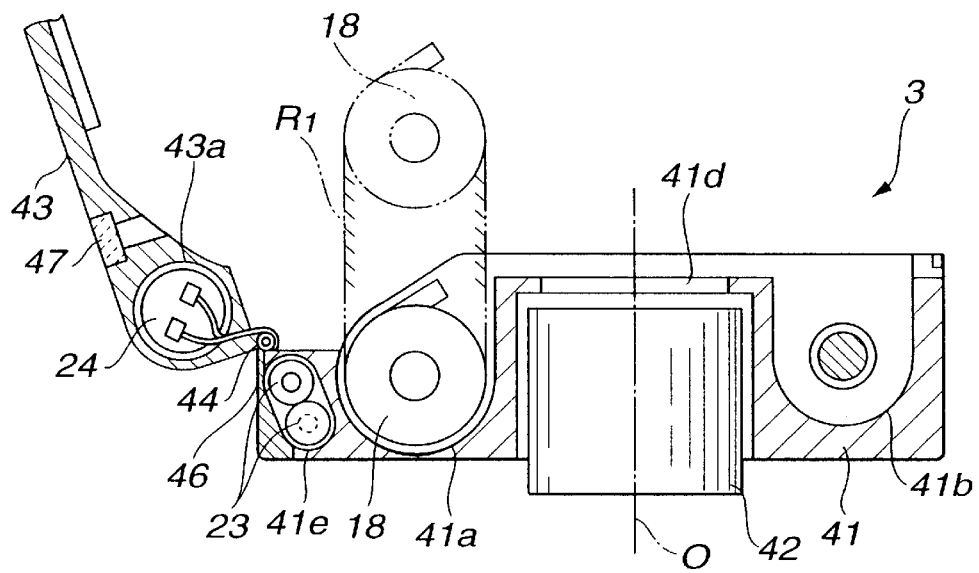
FIG. 8 is a lateral sectional view of the camera according to the third embodiment of foregoing FIG. 7, and illustrates a state where the back cover is opened.

As shown in FIG. 7 and FIG. 8, the camera 3 of the present embodiment differs from the camera 2 of the second embodiment in that the electric component housed in the back cover is a capacitor for stroboscope flashing instead of a battery. A lens barrel 42 is disposed in the center of the camera main body 41 as the exterior member of the camera 3, and an aperture 41d is disposed behind the lens barrel 42. A cassette chamber 41a is provided to the left side of an aperture 41d of the camera main body 41, and a spool chamber 41b having a spool 41c is provided to the right side thereof. A battery chamber 41e housing two power supply batteries 23 and a battery cover 46 turnably supported by a supporting shaft 44 described later and which opens and closes the battery chamber 41e are disposed in the triangular column space in the left anterior position of the camera main body 41 adjacent to the cassette chamber 41a. Moreover, a back cover 43 as the cover member for opening and closing the back face of the aperture 41d and the aperture of the cassette chamber 41a and spool chamber 41b is disposed at the back surface of the camera main body 41.

A cassette 18 is loaded in the cassette chamber 41a. In this loaded state, the direction of the film pullout portion 18a of the cassette 18 is inclined against the face of the aperture 41d, and such pullout direction forms an angle θ1, 90 degrees or less, with respect to the optical axis O. The film 19 pulled out from the film pullout portion 18a of the cassette 18 is temporarily fed to the direction in which the aperture 41d exists with being bent. Therefore, the cassette chamber 41a can be disposed closer to the front face of the camera main body 41 in comparison with the camera 1 of the first embodiment, and the cassette chamber 41a can be disposed close to the lens barrel 42.

The back cover 43 is turnably supported in the D1 direction with a supporting shaft 44 as a shaft member fixed to the left end side of the camera main body 41. This back cover 43 is provided with a platen 45 for pressing the film 19 to the aperture 41d, a capacitor chamber 43a as the electric component housing portion in the vicinity of the supporting shaft 44, and a cassette information display window 47 as a cassette observation window at a position facing the cassette chamber. Moreover, the back cover 43 has an exterior surface parallel to the face of the aperture 41d when in a closed state.

The lead wire of the capacitor 24 is guided inside the camera main body upon passing near the supporting shaft 44. Further, instead of providing the observation window 47 to the back cover 43, the structure may be such that the film information is displayed on a liquid crystal display unit provided separately.

Further, the capacitor chamber 43a is positioned within the loading and unloading trajectory range R1 of the cassette 18 as shown in FIG. 7 with the back cover 43 in a closed state, and a capacitor 24 for stroboscope flashing, which is a cylindrical electric component, is housed therein. As described above, since the cassette chamber 41a is positioned further frontward of the camera main body 41, the capacitor chamber 43a of the back cover 43 can be positioned further into the anterior direction without making it protrude from the back side. Moreover, the measurement of the lateral direction of the camera can be reduced since the cassette chamber 41a is disposed close to the lens barrel 42.

Figure 9:
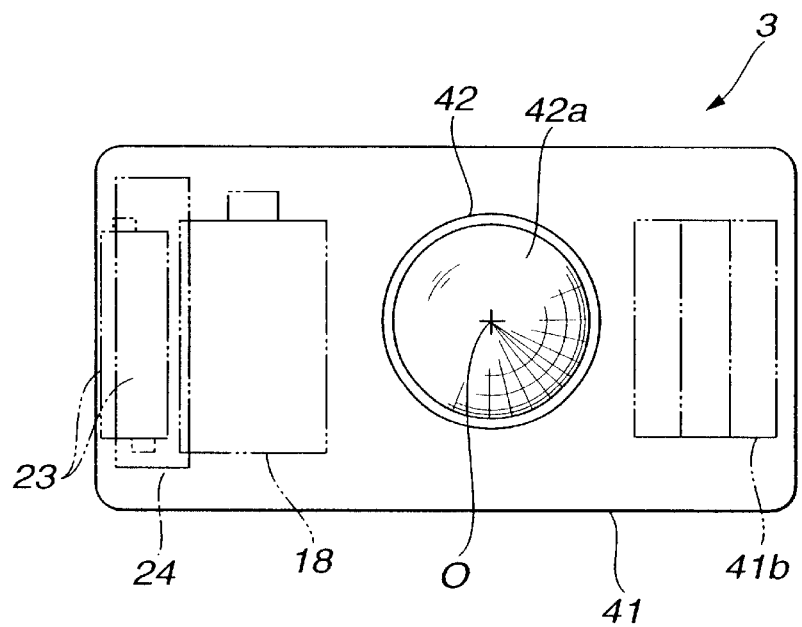
FIG. 9 is a front view of the camera according to the third embodiment of foregoing FIG. 7, and illustrates the arrangement of the cassette, spool, capacitor and battery.

The cassette 18 loaded in the cassette chamber 41a, the spool 41c of the spool chamber 41b, the capacitor 24 housed in the capacitor chamber 43e, and the battery 23 housed in the battery chamber 41a are approximately parallel to each other in the axial direction, as shown in FIG. 9, and are housed or retained in a posture along the vertical direction.

In the camera 3 of the present embodiment having the structure described above, when loading or removing the cassette 18 to or from the cassette chamber 41a, the back cover 43 is turned to the opened state shown in FIG. 8. In this open state, the back cover 43 stays outside the loading and unloading trajectory range R1 of the cassette 18 together with the capacitor chamber 43a, and the aperture of the cassette chamber 41a is thereby released. The cassette 18 may thereby be loaded and removed to and from the cassette chamber 41a.

After loading the cassette 18 in the cassette chamber 41a, the back cover 43 is turned to achieve the closed state shown in FIG. 7. In this closed state, the back cover 43 covers the apertures of the cassette chamber 41a and spool chamber 41b, and simultaneously makes the film 19 contact the back face of the aperture 41d via the platen 45 in a pressurized manner.

After the cassette 18 is loaded in the cassette chamber 41a, the film 19 inside the cassette 18 is wound with the spool 41c of the spool chamber 41b, and photographs may be taken thereby.

According to the camera 3 of the third embodiment described above, while yielding similar effects as with the camera 2 of the foregoing second embodiment, in particular, the capacitor chamber 43a is provided to the back cover 43 such that this capacitor chamber 43a does not protrude from the back face of the back cover 43. Therefore, since the measurements in the width direction and thickness direction (O direction of optical axis) of the exterior shape of the camera main body 41 can be reduced, further miniaturization of the camera is thereby realized.

Next, the camera according to the fourth embodiment of the present invention is described with reference to FIG. 10 to FIG. 12.

Figure 10:
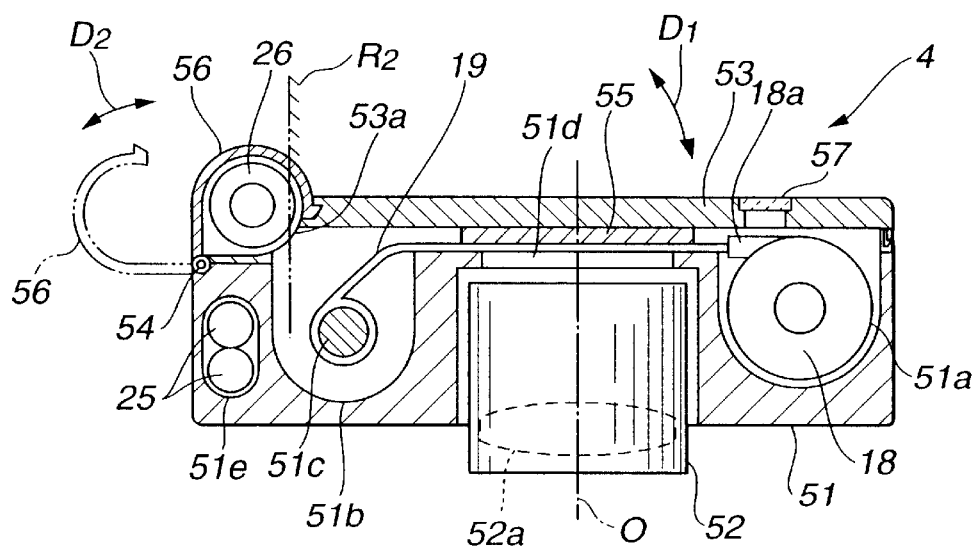
FIG. 10 is a lateral sectional view of the camera according to the fourth embodiment of the present invention, and illustrates a state where the back cover is closed.

FIG. 10 is a lateral sectional view of the camera according to the fourth embodiment of the present invention, and illustrates a state where the back cover is closed. FIG. 11 is a lateral sectional view of the camera, and illustrates a state where the back cover is opened. FIG. 12 is a front view of the camera, and illustrates the arrangement of the cassette, spool, capacitor and battery.

Figure 11:
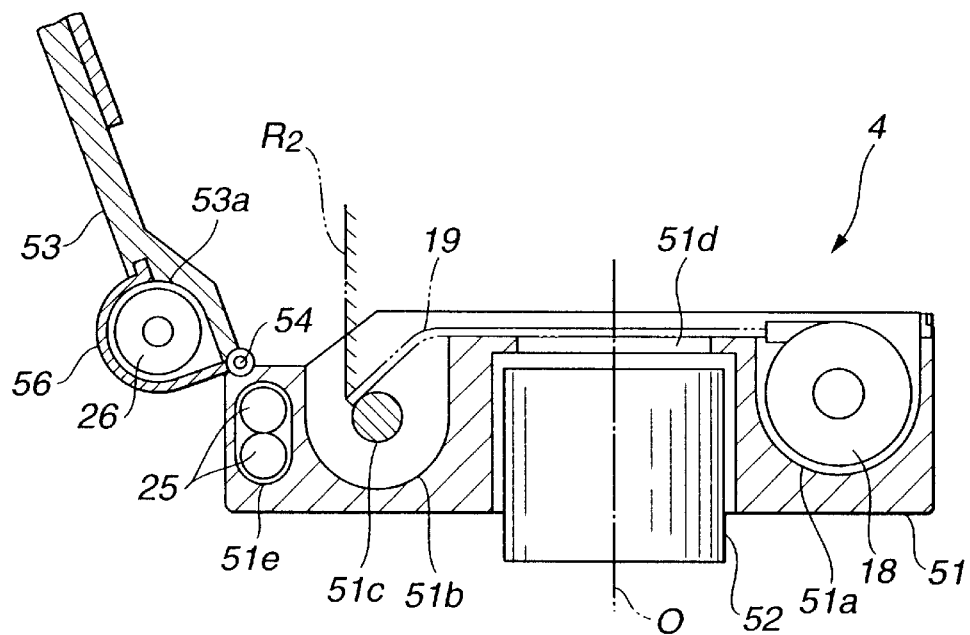
FIG. 11 is a lateral sectional view of the camera according to the fourth embodiment of foregoing FIG. 10, and illustrates a state where the back cover is opened.

As shown in FIG. 10 and FIG. 11, the camera 4 of the present embodiment differs from the camera of the foregoing first embodiment in that the position of the cassette chamber and spool chamber is in an opposite position to the supporting shaft position of the back cover. A lens barrel 52 is disposed in the center of a camera main body 51 as the exterior member of the camera 4, and an aperture 51d is disposed behind the lens barrel 52. A cassette chamber 51a is provided to the right side of the aperture 51d of the camera main body 51, and a spool chamber 51b having a spool 51c is provided to the left side thereof. A capacitor chamber 51e housing two capacitors 25 for stroboscope flashing is disposed in the triangular column space in the left anterior position of the camera main body 51 adjacent to the spool chamber 51b. Moreover, a back cover 53 as the cover member for opening and closing the back face of the aperture 51d and the aperture of the cassette chamber 51a and spool chamber 51b is disposed at the back surface of the camera main body 51.

The cassette 18 is loaded in the cassette chamber 51a. In this loaded state, the direction of the film pullout portion 18a of the cassette 18 is retained in a parallel state toward the film feeding path on the aperture 51d. The film 19 pulled out from the film pullout portion 18a of the cassette 18 is wound with the spool 51c of the spool chamber 51b.

The back cover 53 is turnably supported so as to open and close in the D1 direction with a supporting shaft 54 as an axial member fixed to the left end side of the camera main body 51. This back cover 53 is provided with a cassette information display window 57 facing the cassette chamber 51a, a platen 55 for pressing the film 19 to the aperture 51d, a battery chamber 53a as the electric component housing portion in the vicinity of the supporting shaft 54, and a battery cover 56 turnably supported with the supporting shaft 54 and which is for opening and closing the battery chamber 53a. Moreover, the back cover 53 has an exterior surface parallel to the face of the aperture 51d when in a closed state.

The battery chamber 53a is positioned to be within the film tip trajectory range R2 where the tip of the film 19 led out from the cassette 18 passes through when being loaded inside the camera with the back cover 53 in an opened state (FIGS. 10 and 11), and a battery 26 as the cylindrical electric component is housed therein. Further, the battery cover 56 and battery chamber 53a are provided in a protruding manner at the rear left end of the back cover 53. The protruding portion of the battery cover 56 and battery chamber 53a function as the grip portion of the camera with the back cover 53 in a closed state. Moreover, the joint portion of the battery cover 56 and battery chamber 53a possesses a waterproof structure.

Figure 12:
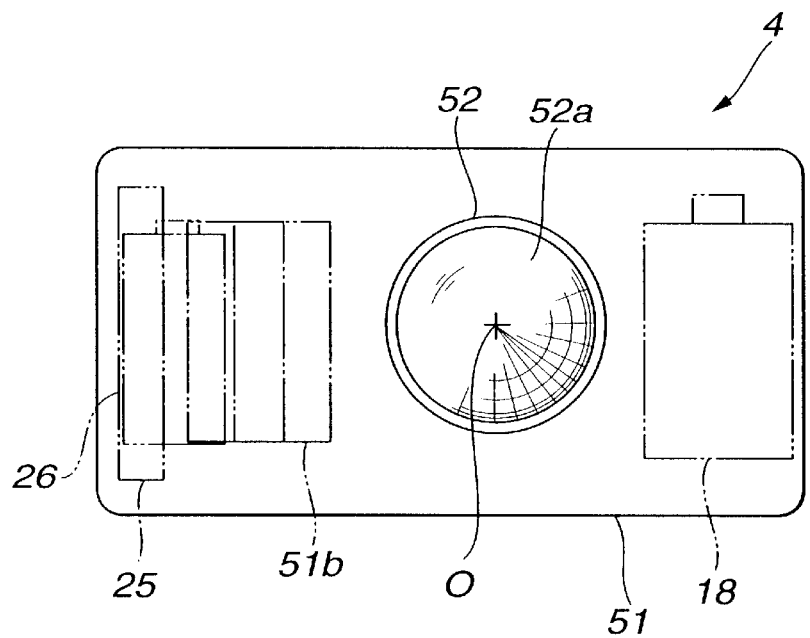
FIG. 12 is a front view of the camera according to the fourth embodiment of foregoing FIG. 10, and illustrates the arrangement of the cassette, spool, capacitor and battery.

The cassette 18 loaded in the cassette chamber 51a, the spool 51c of the spool chamber 51b, the capacitor 25 housed in the capacitor chamber 51e, and the battery 26 housed in the battery chamber 53a are approximately parallel to each other in the axial direction, as shown in FIG. 12, and are housed or retained in a posture along the vertical direction.

In the camera 4 of the present embodiment having the structure described above, when loading or unloading the cassette 18 to or from the cassette chamber 51a, the back cover 53 is turned to achieve an open state as shown in FIG. 11. In this open state, the back cover 53 stays outside the film tip trajectory range R2 together with the battery chamber 53a, and the aperture of the spool chamber 51b is thereby released. Therefore, the cassette 18, from which the film 19 has been led out, can be removed from or loaded in the spool chamber 51b. Since the tip of the film 19 can be observed from the opening of the spool chamber 51b upon loading the cassette 18, the film can be loaded with certainty.

After loading the cassette 18 in the cassette chamber 51a, the back cover 53 is turned to achieve the closed state shown in FIG. 10. In this closed state, the back cover 53 covers the apertures of the cassette chamber 51a and spool chamber 51b, and simultaneously makes the film 19 contact the back face of the aperture 51d via the platen 55 in a pressurized manner.

After the cassette 18 is loaded in the cassette chamber 51a, the film 19 led out from the cassette 18 is wound with the spool 51c of the spool chamber 51b, and photographs may be taken thereby.

With the camera 4 of the fourth embodiment described above, while yielding similar effects as the camera 1 of the foregoing first embodiment, in particular, the spool chamber 51b is disposed at the supporting shaft side of the back cover 53 and on the camera main body 51 at the side in which the battery chamber 53a is disposed. And, when the back cover is in an open state, the back cover 53 and battery chamber 53a both stay outside the film tip trajectory range R2 in the spool chamber 51b. Therefore, when loading or removing the cassette 18 to or from the cassette chamber 51c, the tip of the film 19 led out from the cassette 18 may be easily inserted into or removed from the spool chamber 51b.

Moreover, the battery chamber 53a, which is the electric component housing portion, provided to the back cover 53 can be changed to a capacitor chamber for housing a capacitor for stroboscope flashing. Here, a cover for opening and closing the capacitor chamber 56 is not necessary.

According to the present invention as described above, by providing an electric component housing portion to a back cover capable of being opened and closed, miniaturization of the external shape of the camera is enabled without hindering the loading of a cassette, and as a result a camera having superior portability and favorable holdability is provided.

What is claimed is:

1. A camera comprising:
   a cassette chamber adapted to house a film cassette;
   a cover member for opening and closing an aperture of said cassette chamber; and
   an electric component housing portion which is disposed on said cover member and which is adapted to house an electric component positioned within a trajectory of loading and unloading of the film cassette itself to and from said cassette chamber in a state where said cover member is closed,
   wherein said electric component housing portion is adapted to stay outside said trajectory in a state where said cover member is opened, and
   wherein said electric component housing portion is provided approximately rearward of said cassette chamber in the state where said cover member is closed.

2. The camera according to claim 1, wherein said electric component comprises a capacitor for effecting stroboscopic flashing of the camera.

3. The camera according to claim 1, wherein said electric component comprises a power supply battery of the camera.

4. The camera according to claim 3, further comprising a battery cover which is supported by said cover member and which is adapted to open and close an opening for loading and unloading said power supply battery.

5. The camera according to claim 4, wherein said cover member and said battery cover are opened and closed by being turned, and said cover member and said battery cover can be turned at a same point of rotation.

6. The camera according to claim 5, further comprising a single shaft member for turnably supporting said cover member and said battery cover.

7. A camera comprising:
   a cassette chamber adapted to house a film cassette in a state where a film pullout portion of the film cassette is at a prescribed inclination to an aperture of the camera;
   a cover member for opening and closing said cassette chamber, said cover member having an exterior surface formed approximately parallel to said aperture; and
   an electric parts housing portion provided on said cover member and disposed in a space defined by said exterior surface of said cover member, the film pullout portion of the film cassette housed in said cassette chamber, and a side portion of the camera, wherein said electric parts housing portion is positioned within a trajectory of loading and unloading of the film cassette itself to and from said cassette chamber in a state where said cover member is closed, wherein said electric parts housing portion is adapted to stay outside said trajectory in a state where said cover member is opened, and wherein said electric parts housing portion is provided approximately rearward of said cassette chamber in the state where said cover member is closed.

8. The camera according to claim 7, wherein said electric parts housing portion is adapted to house a power supply battery of the camera.

9. The camera according to claim 8, further comprising a battery cover which is provided on said cover member and which is adapted to open and close an opening for loading and unloading said power supply battery.

10. The camera according to claim 9, wherein said cover member and said battery cover are opened and closed by being turned, and said cover member and said battery cover can be turned on a same point of rotation.

11. The camera according to claim 10, further comprising a single shaft member for turnably supporting said cover member and said battery cover.

12. The camera according to claim 7, wherein said electric parts housing portion is adapted to house a capacitor for effecting stroboscopic flashing of the camera.

13. The camera according to claim 7, further comprising an observation window which is provided on said cover member and which is adapted to enable observation of the film cassette housed in said cassette chamber, and wherein said electric parts housing portion is disposed in a position to avoid said observation window.

14. The camera according to claim 7, wherein said electric parts housing portion is shaped to house an approximately cylindrical electric part such that an axial direction of the electric part is approximately parallel to an axial direction of the film cassette housed in said cassette chamber.

15. The camera according to claim 7, wherein said electric parts housing portion protrudes toward a back of the camera against said exterior surface of said cover member.

16. A camera comprising:

a cassette chamber adapted to house a film cassette;

a spool chamber of an approximately cylindrical shape for winding and housing a film in the film cassette housed in said cassette chamber;

a cover member for opening and closing apertures of said cassette chamber and said spool chamber; and an electric component housing portion which is disposed on said cover member, and which is adapted to house an electric component, wherein said electric component housing portion is provided at a position so as to stay away from a tip position of the film upon said film being loaded into the film cassette when said cover member is in an open position, and wherein said electric component housing portion is provided approximately rearward of said spool chamber when said cover member is in a closed position.

17. The camera according to claim 16, wherein said electric component has an approximately cylindrical shape and is disposed approximately parallel to an axial direction of said spool chamber.

18. The camera according to claim 17, wherein said electric component comprises a power supply battery of the camera.

19. The camera according to claim 17, wherein said electric component comprises a capacitor for effecting stroboscopic flashing of the camera.

* * * * *